(12) United States Patent
Balakrishnan et al.

(10) Patent No.: US 8,589,319 B2
(45) Date of Patent: Nov. 19, 2013

(54) ADAPTIVE PAIRWISE PREFERENCES IN RECOMMENDERS

(75) Inventors: Suhrid Balakrishnan, Scotch Plains, NJ (US); Sumit Chopra, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 233 days.

(21) Appl. No.: 12/958,434

(22) Filed: Dec. 2, 2010

(65) Prior Publication Data
US 2012/0143802 A1    Jun. 7, 2012

(51) Int. Cl.
*G06F 15/18* (2006.01)

(52) U.S. Cl.
USPC .......................................................... 706/14

(58) Field of Classification Search
None
See application file for complete search history.

(56) References Cited

U.S. PATENT DOCUMENTS

| 5,890,152 | A | 3/1999 | Rapaport et al. | |
|---|---|---|---|---|
| 6,826,541 | B1 | 11/2004 | Johnston et al. | |
| 7,596,505 | B2 | 9/2009 | Keil et al. | |
| 7,698,161 | B2 | 4/2010 | Keil et al. | |
| 2002/0004739 | A1 | 1/2002 | Elmer et al. | |
| 2003/0093792 | A1 | 5/2003 | Labeeb et al. | |
| 2004/0076936 | A1* | 4/2004 | Horvitz et al. | 434/236 |
| 2007/0233730 | A1 | 10/2007 | Johnston | |
| 2008/0189232 | A1* | 8/2008 | Dunning et al. | 706/45 |
| 2008/0256054 | A1* | 10/2008 | Saaty | 707/5 |
| 2009/0055139 | A1* | 2/2009 | Agarwal et al. | 703/2 |
| 2009/0328104 | A1 | 12/2009 | Jones et al. | |
| 2010/0030764 | A1* | 2/2010 | Koren | 707/5 |
| 2010/0114803 | A1* | 5/2010 | Moon et al. | 706/12 |
| 2010/0169158 | A1* | 7/2010 | Agarwal et al. | 705/10 |
| 2010/0257128 | A1* | 10/2010 | De Vries et al. | 706/12 |
| 2011/0112981 | A1* | 5/2011 | Park et al. | 705/347 |
| 2011/0153663 | A1* | 6/2011 | Koren et al. | 707/776 |
| 2011/0230229 | A1* | 9/2011 | Das et al. | 455/550.1 |

* cited by examiner

*Primary Examiner* — Kakali Chaki
*Assistant Examiner* — Michael Zidanic
(74) *Attorney, Agent, or Firm* — Scott P. Zimmerman, PLLC

(57) ABSTRACT

Methods, systems, and products adapt recommender systems with pairwise feedback. A pairwise question is posed to a user. A response is received that selects a preference for a pair of items in the pairwise question. A latent factor model is adapted to incorporate the response, and an item is recommended to the user based on the response.

13 Claims, 6 Drawing Sheets

FIG. 3

Data: Item factors, $V$. Parameters $pop_{th}$, $pop_{dec}$, $d_{svd}$, $n_{svd}$, $top_k$
Result: User parameters $u$, at each iteration $N$.
Initialize $u \sim \mathcal{N}(u|\mu_0, \Sigma_0)$, $N = 0$.
while *User provides feedback* do
　　// *Get $n_{svd}$ principal directions*
　　$[D, S]$=t-SVD$(\Sigma_N, n_{svd})$
　　for $z=1:n_{svd}$ do
　　　　// *Get candidate items using heuristic filters*
　　　　$C \leftarrow$ pop-filter$(\mathcal{I}, pop_{th})$ (H2)
　　　　$C \leftarrow$ like-filter$(C, top_k)$ (H3)
　　　　$C \leftarrow$ PCA-filter$(C, n_{svd}, D_z)$ (H1)
　　　　$C \leftarrow$ used-filter$(C, \text{used } l \text{ and } r\text{'s})$ (H4)
　　　　// *Use IG on C to find feedback pair l, r*
　　　　$l, r \leftarrow \text{argmax}_{IG} C$
　　　　// *Present user with choice; Get feedback*
　　　　$y_{l>r}^{N+1} \leftarrow \arg(\text{"Do you prefer } l \text{ or } r\text{"?})$
　　　　// *Incorporate new data*
　　　　$\theta^{N+1} = \{v_l^{N+1}, v_r^{N+1}, b_l^{\mathcal{I}}, b_r^{\mathcal{I}}, s_{lr}\}$
　　　　$\Theta^{N+1} = \Theta^N \cup \theta^{N+1}$, $y = y \cup y_{l>r}^{N+1}$
　　　　// *Compute new parameter estimates using EP*
　　　　$\mu_{N+1}, \Sigma_{N+1} \leftarrow EP(y, \Theta^{N+1}, (\mu_0, \Sigma_0))$
　　　　Thus, $u \sim \mathcal{N}(u|\mu_{N+1}, \Sigma_{N+1})$
　　　　$N \leftarrow N + 1$
　　　　// *Decrease strength of the popularity filter*
　　　　$pop_{th} \leftarrow \min(0, pop_{th} - pop_{dec})$
　　end
end

ADAPTIVE PAIRWISE PREFERENCES IN RECOMMENDERS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to data processing and, more particularly, to machine learning and to database schemes.

Recommenders are widely used in movies, music, products, and even social networking. Recommenders are computers and software that recommend movies, music, books and other items that may appeal to a user. Conventional recommenders use ratings information to extrapolate preferences of users. Users, for example, are commonly asked to rate items using a numeric "star" system (e.g., 1 star="Hate it" and 5 stars="Love it"). Conventional recommenders then use latent factor models to recommend movies, music, and other items that may appeal to users. Conventional recommenders, however, fail to account for changing user tastes. A user's preferences may change over time, but conventional recommenders fail to reflect these changes.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIG. 3 is a high level pseudo-code summary for an algorithm that uses pairwise adaptive sequential feedback, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
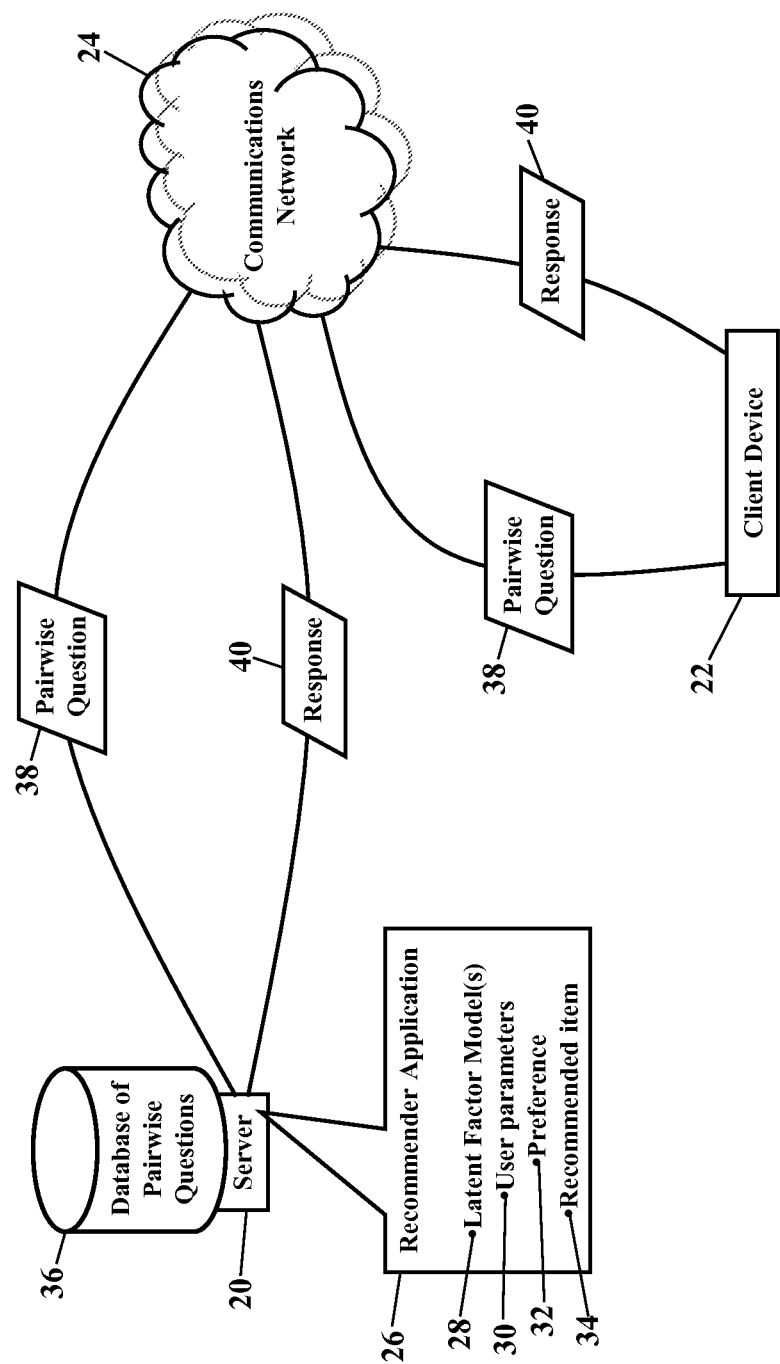
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that recommends items to users. A server 20 communicates with a client device 22 via a communications network 24. The server 20 executes a recommender application 26 that recommends an item (such as movies, music, and other items) to a user of the client device 22.

The recommender application 26 may access any one or more latent factor models 28. Latent factor models may generally assume that there are unobserved user-specific and item-specific latent (or hidden) parameters 30 whose combination determines a preference 32 that the user will have for an item. These user and item-specific parameters 30 may be estimated using an observed sparse ratings matrix. The latent factor models 28 may then be deployed to recommend an item 34 to the user. Because latent factor models are known, this disclosure will not greatly discuss the known details.

The latent factor models 28, however, are often inadequate. A user's tastes or preferences often change over time. The user may wish to provide information to the recommender application 26 to reflect these changes in the user's tastes or preferences. Additionally, the user may desire to improve their current recommendations by providing feedback to the recommender application 26.

The recommender application 26 may thus access a database 36 of pairwise questions. The database 36 of pairwise questions stores one or more pairwise questions 38 that ask the user, at the client device 22, to compare two items. In the movie domain, for example, the user may be asked whether she prefers the "The Godfather" or "Annie Hall." The user at the client device 22 provides a response 40, and the response 40 communicates back to the server 20. The recommender application 26 may then incorporate the response 40 into any of the latent factor models 28 and update the user's parameters 30. Using these updated user parameters, the recommender application 26 may then retrieve another pairwise question 38 from the database 36 of pairwise questions, and the user again provides the response 40. The recommender application 26 may continue posing a sequence of the pairwise questions 38, with each subsequent pairwise question picked using the updated (or current) user parameters, and soliciting the user's responses 40, for as long as the user is willing to provide feedback. An initial pairwise question 38 likely results in a rough estimate of the user's parameters 30. Each successive response 40, though, may be incorporated into the latent factor model 28 to recursively refine an estimate of the user's parameters 30.

The recommender application 26 may thus incorporate adaptive pairwise preference feedback into the deployed latent factor model 28. Exemplary embodiments ask user to make a sequence of pairwise judgments. At each stage, the user's response 40 may be incorporated with their existing model to "hone in" on their specific preferences. The recommender application 26 may be adaptive, in that the user's responses 40 to previous pairwise questions 38 may affect subsequent pairwise questions 38.

Figure 2:
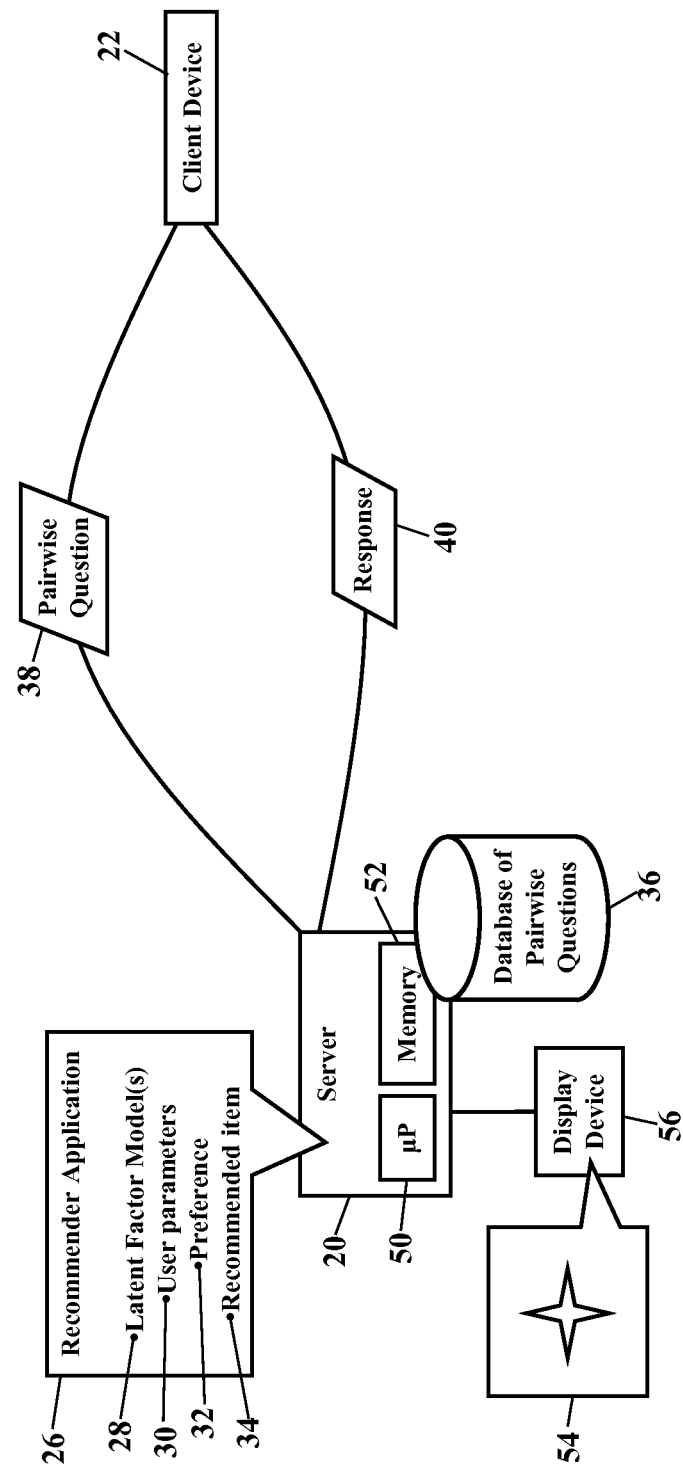
FIG. 2 is a more detailed schematic illustrating the operating environment, according to exemplary embodiments.

FIG. 2 is a more detailed schematic illustrating the operating environment, according to exemplary embodiments. The server 20 has a processor 50 (e.g., "μP"), application specific integrated circuit (ASIC), or other component that executes the recommender application 26 stored in a memory 52. The recommender application 26 may cause the processor 50 to produce a graphical user interface ("GUI") 54. The graphical user interface 54 is illustrated as being visually produced on a display device 56, yet the graphical user interface 54 may also have audible features. The recommender application 26, however, may operate in any processor-controlled device, as later paragraphs will explain.

The recommender application 26 may access the database 36 of pairwise questions. The database 36 of pairwise questions is illustrated as being locally stored in the memory 52, but the database 36 of pairwise questions may be remotely accessed and maintained at any location in the communications network (illustrated as reference numeral 24 in FIG. 1). The recommender application 26 sends the one or more pairwise questions 38 to the client device 22, and the client device 22 sends the user's responses 40. The recommender application 26 may then incorporate each successive response 40 into the latent factor model 28 to refine an estimate of the user's parameters 30.

The recommender application 26 may utilize a Bayesian framework and assume a multivariate Normal form for the prior distribution of the current user parameter vector. Conditioned on this current user distribution, the recommender application 26 may find the most informative pair of items for which to obtain feedback. The user's preference 32 over the latest pairwise question 38 is obtained, and then the belief of the user's parameters 30 may be updated based on this preference 32. The update thus requires incorporating pairwise feedback into the latent factor model 28. The entire process is iterated for as many pairwise questions 38 as the user is willing to answer.

Modeling of Pairwise Preferences

The recommender application 26 may access a standard collaborative filtering corpus, consisting of a partially observed ratings matrix R on a set of users, U, and items, I. The recommender application 26 may index over the users and items, by employing j∈U for the users, and i∈I, for the index over items. Thus, an individual rating may be referred to as $R_{ij}$, and will denote by m, the number of items (m=|I|) and by n the number of users (n=|U|). The ratings matrix R may be sparse, and so the recommender application 26 may only observe ratings for a fraction of the user-item pairs. In a typical latent factor model the prediction for an unseen rating is given by:

$$\hat{R}_{ij} = b^g + b_i^I + b_j^u + v_i^T u_j, \quad \text{(Equation \#1)}$$

where $b^g$ is a global bias/offset term (a scalar), and $b^I$ and $b^u$ are vectors of item and user biases, of length m and n respectively, with the i-th element of $b^I$ equal to $b_i^I$ (from Equation #1) and the j-th element of $b^u$ equal to $b_j^u$ (again from Equation #1). The factors (or parameters) for each item i and user j, are the k-dimensional vectors $v_i$ and $u_j$ (an error term may also be included to complete the model specification, and Gaussian noise is typically the error form used). The collected matrix of these parameter vectors may be referred to as V and U. Typically, k is much smaller than either m or n, and models the inventors' belief that a small number of unobserved factors are sufficient to provide accurate ratings.

In order to incorporate the user's pairwise preference feedback in the latent factor model 28, the recommender application 26 may operate in a Bayesian framework. The inventors believe that the user parameter vector, $u_\star$, can be captured probabilistically by a multivariate Normal (MVN) distribution. That is, the prior on $u_\star$ is:

$$p(u_\star) = \mathcal{N}(u_\star | \mu_\star, \Sigma_\star). \quad \text{(Equation \#2)}$$

Considering the learned factor model (where V, $b^I$, and $b^u$ have all been estimated) in the light of this belief, the inventors' predictions for items become probabilistic:

$$\hat{R}_{i\star} = b^g + b_i^I + b_\star^I + b_\star^u + v_i^T u_\star$$

$$p(\hat{R}_{i\star} | v_i, b^g, b_i^I, b_\star^u, \mu_\star, \Sigma_\star) = \mathcal{N}(\hat{R}_{i\star} | \rho_i, \sigma_i)$$

$$\rho_i = b^g + b_i^I + b_\star^u + v_i^T \mu_\star$$

$$\sigma_i^2 = v_i^T \Sigma_\star v_i, \quad \text{(Equation \#3)}$$

and indeed, Normally distributed. In other words, each predicted rating is Gaussian distributed with an item specific mean and variance. Further, given a pair of items, say l and r, denote the predicted difference in preference 32 between them by $$\Delta_{lr} = \hat{R}_{l\star} - \hat{R}_{r\star}.$$

In a manner similar to the above, one can also readily show that this difference is Normally distributed as well:

$$\Delta_{lr} = \hat{R}_{l\star} - \hat{R}_{r\star} = b_l^I - b_r^I + (v_l - v_r)^T u_\star$$

$$\Delta_{lr} \sim \mathcal{N}(\rho_{lr}, \sigma_{lr}^2)$$

$$\rho_{lr} = b_l^I - b_r^I + (v_l - v_r)^T \mu_\star$$

$$\sigma_{lr}^2 = (v_l - v_r)^T \Sigma_\star (v_l - v_r). \quad \text{(Equation \#4)}$$

This defines a (derived) model for the user's preference 32 for item l over item r. Some characteristics of this model are: it is probabilistic, which is a result of the uncertainty associated with estimating the users' parameters $\mu_\star, \Sigma_\star$. The model assigns a high probability to preferring l in cases where $\rho_{lr}$ is large and $\sigma_{lr}^2$ is small. This can occur in a number of ways that match intuition. For example, this probability is large when $$b_l^I - b_r^I$$

is small, but when $$(v_l - v_r)^T \mu_\star$$

is large. In this case, l is much more aligned with what is known to be the users interests $\mu_\star$ than r, and so there may be strong reasons to believe that l would be preferred by the user.

More formally, denote $y_{l>r}$ as the binary (Bernoulli) random variable for the user's pairwise preference of l over r (defined on any pair of items (l, r) from I×I). Explicitly, if $y_{l>r}=1$, this implies that the user prefers l over r. If $y_{l>r}=0$, then this implies that the user instead prefers r over l. The model in Equation #4 directly leads to the probability that determines the Bernoulli random variable $y_{l>r}$ (where the conditioning on $v_l$, $v_r$, $\mu_\star$ and $\Sigma_\star$ may be suppressed for clarity):

$$P(y_{l>r}=1) = P(\Delta_{lr} \geq 0) = \int_0^\infty \mathcal{N}(s \mid \rho_{lr}, \sigma_{lr}^2) ds = \Phi\left(\frac{\rho_{lr}}{\sigma_{lr}}\right).$$

Note that $\Phi(z)$ is the probit or zero mean unit variance Gaussian c.d.f. function, i.e., $$\Phi(z) = \int_{-\infty}^z \mathcal{N}(x \mid 0, 1) dx = \int_{-\infty}^z \frac{1}{\sqrt{2\pi}} e^{-x^2/2} dx.$$

In the above expression, $\rho_{lr}$ and $\sigma_{lr}$ are the quantities in the derived model in Eq. 4. This probability may be the motivation for the choice of a probit function when defining the model which is conditioned on the user vector, $u_\star$:

$$P(y_{l>r}=1 \mid u_\star, \theta_{lr}) = \Phi\left(\frac{\Delta_{lr}}{s_{lr}}\right) = \Phi\left(\frac{b_l^I - b_r^I + (v_l - v_r)^T u_\star}{\sqrt{v_l^T \Sigma_\star v_l + v_r^T \Sigma_\star v_r}}\right), \quad \text{(Equation #5)}$$

where we define the pair parameters $\theta_{lr} = \{v_l, v_r, b_l^I, b_r^I, s_{lr}\}$. For a given user parameter vector $u_\star$, the model states that a large positive disparity between the estimated ratings implies a higher probability for choosing item l over r. Furthermore, the model assigns low probability to "noisier" observations: pairs where $$s_{lr}^2 = v_l^T \Sigma_{561} v_l + v_r^T \Sigma_\star v_r$$

is large, which is also reasonably intuitive. Finally, the model allows the inventors to compute the likelihood of any particular parameter value for a user $u_\star$, given the pair parameters $\theta_{lr}$ and the user preference 32 over these items $y_{l>r}$.

The estimate of the variance $s_{lr}^2$ is used to normalize observation in the model as opposed to $\sigma_{lr}^2$ (Equation #4, for the derived model). The use of $s_{lr}^2$ makes more sense in the conditional model, as the inventors do not believe that how close the l and r items are parametrically should influence confidence that their difference is significant.

The above paragraphs thus describe a model (Equation #5) that formalizes how pairwise feedback may be incorporated in a principled manner. Exemplary embodiments pose the sequence of pairwise preference questions 38 to the user, and the user's responses 40 are incorporated using this model. Importantly, though, what pair of items should be first solicited? How will past pairwise questions and answers affect questions to be asked in the future? Is this adaptive pairwise feedback scheme an efficient way to incorporate user feedback? How does pairwise feedback compare to ratings based feedback?

What Pairwise Questions to Ask?

Recall that the goal is to efficiently and accurately provide recommendations to the user. Thus, informally, when choosing a pair of items for feedback, the pair of items that allows the recommender application 26 to rapidly learn the user's parameter vector is particularly useful. Other considerations of a feedback pair are that the pair of items should be interesting or intriguing to the user and that the pair be chosen adaptively. That is, previous feedback pairs should affect the pairs presented in future.

Exemplary embodiments may thus utilize sequential Bayesian experimental design for choosing feedback pairs. In particular, exemplary embodiments may employ an information gain-based criterion. This criterion approximates the expected change in entropy or information gain between the user parameter distribution before and after receiving feedback, for any pair of items. This reduces the task of choosing a feedback pair to simply finding a pair that maximizes the information gain about the user parameters. The below paragraphs thus describe the derivation of the inventors' criterion.

Formally, start with the fact that the (differential) entropy h for a k-dimensional MVN distribution with covariance matrix S, is given by the expression:

$$h = \frac{k}{2}(1 + \log(2\pi)) + \frac{1}{2}\log(|S|).$$

Assume, as before, that the user parameters are MVN distributed:

$$p(u) = \mathcal{N}(u \mid \mu_N, \Sigma_N).$$

Note that the subscript N is explicitly used to denote the user parameters at a stage after collecting N such responses (illustrated as reference numeral 40). The user index * has also been dropped for clarity. Also, recall from the previous section (e.g., Equation #5) that given any one pair of items l and r, its pair parameters $\theta_{lr}$ and pairwise binary response $y_{l>r}$, the log-likelihood of the user parameters 30 can be obtained using Equation #5 as:

$$l(u) = y_{l>r} \log(\Phi(\delta_{lr})) + (1 - y_{l>r}) \log(1 - \Phi(\delta_{lr})),$$

where $\delta_{lr} = \Delta_{lr}/s_{lr}$ from Equation #4. Using a local quadratic approximation of the expected likelihood about the current mean parameter values $\mu_N$, the covariance of the posterior distribution may be approximated as:

$$\Sigma_{N+1} \approx \Sigma_N + \frac{1}{s_{lr}^2} \frac{\phi^2(\delta_{lr})}{\Phi(\delta_{lr})(1-\Phi(\delta_{lr}))} (v_l - v_r)(v_l - v_r)^T,$$

$$\text{where } \phi(z) = \mathcal{N}(x \mid 0, 1) = \frac{1}{\sqrt{2\pi}} e^{-x^2/2}.$$

The above approximation uses the expected Hessian of the negative log-likelihood $$\left(-E\left[\frac{\partial^2 \ell}{\partial u^2}\right]\right),$$

also known as the information matrix).

Using known linear algebra techniques and simplifications, this results in the total information gain criterion, $IG_{lr} = h_{N+1} - h_N$ being evaluated (to proportionality) as:

$$IG_{lr} = \log\left(1 + \frac{1}{s_{lr}^2} \frac{\phi^2(\delta_{lr})}{\Phi(\delta_{lr})(1-\Phi(\delta_{lr}))}(v_l - v_r)^T \Sigma_N (v_l - v_r)\right). \quad \text{(Equation \#6)}$$

Following these assumptions and derivation, the choice of the next pair of items (l, r) to get feedback for would be ones that maximize $IG_{lr}$. The reader, though, is asked to examine the properties of this criterion, in particular, the parts of the second term in the log expression in Equation #6. The first term, $1/s_{lr}^2$, is favored for a pair of items whose variance is small, or in other words, pairs for whom a low noise measurement may be made. The second term, involving the p.d.f. and c.d.f. of N(x|0, 1), favors a pair of items whose $\delta_{lr}$ value is close to zero. In other words, this term favors item pairs where the inventors predict the user will like both items almost equally. This matches intuition, in that feedback on difficult choices should be more informative. Stated differently, the inventors expect getting feedback on pairs which have a high disparity in ratings would not be as informative—in extremely few cases would the user prefer an item predicted to be much worse over an item predicted to be much better. The last term $[(v_l-v_r)^T \Sigma_N (v_l-v_r)]$ favors pairs that are maximally distant (using Mahalanobis distance) in terms of the uncertain parameters. Loosely speaking, this term favors pairs from areas in the parameter space where error bars are currently high, which again is very reasonable. Thus, the criterion balances some very reasonable requirements. Note however, as with any criterion, it is not perfect. This disclosure thus next discusses some drawbacks and potential fixes.

Criterion Drawbacks and Modifications

Given the fact that exemplary embodiments may operate in a sequential design setting and will likely get feedback on more than one pairwise question, perhaps the most difficult drawback to address is the myopia of the criterion. Modulo the approximations, the criterion is 'D-optimal' for selecting feedback from a single question. Thus, if it is known beforehand that feedback may be solicited for some q questions (q>1), how should the questions be selected so as to maximize the total information gain? This is a much more difficult problem to approach. Although there has been some work to extend the information gain based analysis to this setting, the inventors instead choose to tackle this issue pragmatically, with the following principal components analysis (PCA) based heuristic (H1).

Given a MVN user distribution at every stage in the process, questions may be asked along multiple principal directions of variation of the current user vector distribution. By asking several sequential pairwise questions 38 based on a few (or all) principal directions, exemplary embodiments may offset myopia somewhat, as these directions take into account global variation in the uncertainty of the users parameters 30. Concretely, the heuristic takes as input some number, $d_{svd}$, of principal directions along which the model will pick the pairs of items to seek feedback for. A truncated singular value decomposition (t-SVD) of the current user covariance matrix is performed to obtain the v=1 ... $d_{svd}$ principal directions. For each direction $D_v$, candidate items $n_{svd}$ are picked with maximal separation when projected on to that principal direction. This process defines a simple filter of the items where the filtered candidates C←PCA-filter (Item set, $n_{svd}$, $D_v$). Note that for stability, although the distribution of the user parameter vector may be updated after each feedback response 40, exemplary embodiments may only look for new principal directions after $n_{svd}$ responses have been obtained.

Another issue with direct use of the criterion stems from the fact that uncertainty in the model is typically high in the outer edges of the parameter space, for example, for movies with low support (low numbers of ratings in the training data). Not recognizing this fact would lead to picking extreme items in the pairwise questions 30, which is less than desirable. Because high uncertainty regions of the parameter space are typically places where there is not much information (or interest), exemplary embodiments may dampen this effect with a counteracting popularity heuristic (H2). Popularity of an item is defined as the number of times it has been rated. The candidate item list may be filtered based on a popularity threshold $pop_{th}$, to favor items being picked from amongst the popular ones, C←pop-filter(Item set, $pop_{th}$). In order to allow greater user expressivity as more is learned about a user as the sequence of pairwise questions 38 unfolds, exemplary embodiments may also progressively reduce the effect of this popularity filter with each pairwise question asked. This is achieved by decrementing the threshold with each pairwise question 38 by a constant parameter $pop_{dec}$. Thus to start with the pairwise questions 38 are asked based on popular items, by setting $pop_{th}$ to a high value. As more and more feedback is acquired, $pop_{th}$ is continually decremented and thus results in the range of items from which the pairwise questions 38 are picked is expanded to eventually encompass the whole item set I.

The IG criterion is also agnostic to the predicted ratings of the items. This is a problem because asking the user for the preference 32 between two items that are predicted they will very strongly dislike is not desirable. For this reason, and because our concern is getting recommendation for items that the user will like, exemplary embodiments may also filter the candidate list of items by picking the top ranked items predicted at the current step (a parameter $top_k$): C←like-filter (Item set, $top_k$) (H3).

A heuristic may be obtained which prevents picking any item for pairwise questions more than once (H4: used-filter (Item set, used ls, used rs). Exemplary embodiments may use this filter mainly because asking users to compare the same item in two different contexts (two different pairwise comparisons) may be confusing and lead to transitivity issues. Pairwise comparisons are known to be susceptible to transitivity issues, for example getting feedback in comparisons where a user declares a preference for X over Y and Y over Z but then also Z over X. Because exemplary embodiments use a factor model, a total ordering over the items may be maintained.

All of these heuristics are defined as simple filters for items given an input set of items. After applying the filters, exemplary embodiments obtain a filtered list of candidate items. Exemplary embodiments may then evaluate the IG criterion on all pairs of these candidate items.

Pairwise Adaptive Sequential Feedback

This disclosure now describes the overall procedure for adaptive parameter estimation. The Bayesian paradigm very naturally lends itself to the sequential aspect of the task as well. Starting with a prior distribution for the user parameter vector, the IG criterion is used to find a pair of items and a feedback is sought for them. The pairwise response is combined with the prior distribution using Bayes rule, employing the likelihood given in Equation #5. This results in the posterior distribution for the user vector, which can be treated as the subsequent prior distribution for the next step of feedback in this sequential process.

More formally, assume a MVN prior distribution of the user parameter vector:

$$p(u) = \mathcal{N}(u|\mu_0, \Sigma_0).$$

Further, assume that N responses (illustrated as reference numeral 40) have thus far been obtained. The objective is to incorporate all N feedback pair responses with the prior information. The $z^{th}$ binary response denoted to items l and r is $y_{l>r}^z \in (0, 1)$. Also, let y be the set of all such responses and $\Theta$ the set of all pair parameters, i.e., $y = \{y_{l>r}^z\}$, $\Theta = \{\theta^z\} \forall z \in 1 \ldots N$. Then, according to Bayes theorem:

$$p(u|y, \Theta) \propto p(u|\Theta) P(y|\Theta, u) = p(u) \prod_{z=1}^{N} P(y^z|\theta^z, u)$$

In the above formula, $$t^z(u) = P(y^z|\theta^z, u)$$

is the likelihood term for the $z^{th}$ feedback pair, which can be evaluated using the expression:

$$t^z(u) = \Phi(\delta_{lr}^z)^{y_{l>r}^z}(1-\Phi(\delta_{lr}^z))^{(1-y_{l>r}^z)},$$

with $$\delta_{lr}^z = \Delta_{lr}^z / s_{lr}^z.$$

This is a straightforward outcome of the model in Equation #5.

Unfortunately, the lack of conjugacy of the prior and likelihood function forms implies that there is no analytic/closed form expression for the posterior distribution p(u|y, $\Theta$), making some form of approximation necessary. Also recall that the PCA heuristic relies on an MVN form of the posterior distribution. Both of these reasons motivate the form of the posterior distribution approximation. The inventors thus use Expectation Propagation (EP), an approximate Bayesian inference algorithm described in T. P. Minka, *Expectation Propagation for Approximate Bayesian Inference*, Proceedings UAI-2001, pages 362-369 (2001).

Expectation Propagation (EP) utilizes individual likelihood term approximations to render the prior-likelihood combination analytically tractable. Provided the term approximations are good, the posterior approximation will be good as well. In EP this is ensured by utilizing likelihood term approximations such that the posterior distribution using the term approximation and the posterior distribution with the true likelihood are close in KL-divergence. Here, exemplary embodiments may use individual Gaussian approximation terms, $\tilde{t}^i(u)$ for the likelihood terms $t^i(u)$. This results in a posterior distribution that is MVN (just like the prior):

$$p(u|y, \Theta) \propto p(u) \prod_{z=1}^{N} P(y^z|\theta^z, u) = p(u) \prod_{z=1}^{N} t^z(u) \approx p(u) \prod_{z=1}^{N} \tilde{t}^z(u).$$

Practically, an EP posterior approximation is obtained by solving a coupled system of equations using an iterative algorithm until convergence to a (local) fixed point.

FIG. 3 is a high level pseudo-code summary for an algorithm that uses pairwise adaptive sequential feedback, according to exemplary embodiments. The algorithm has some nice properties. First, the algorithm is anytime—it can be stopped after any number of pairwise responses 40 and it will produce its best estimate of parameters 30 given the data until that point. This is a useful property in that the algorithm can be deployed without specifying the number of pairwise questions 38 to ask the user (the user can stop responding whenever she wishes). Another nice property arises from the adaptive nature of chosen questions: a personalized on-demand recommendation scenario. This scenario relies on an ability to rapidly produce different lists of recommendations for the same user based on his particular preferences 32 at different points in time. Because the sequence of pairwise questions 38 are not scripted in advance, different responses 40 by the same user will result in very different questions being asked and thus different recommendations 34 are made.

Experiments were performed to evaluate pairwise adaptive sequential feedback. These experiments were conducted to evaluate the following aspects. First, does this pairwise sequential feedback mechanism produce predictively good user parameter values? Second, how much information about the user is gained from the pairwise feedback, as compared to ratings based parameters? Is pairwise feedback more efficient at user parameter localization?

Answers to these questions were provided by a user study. The study was designed for a movie dataset. The study was used to evaluate utility of pairwise feedback. The study also helps reveal the efficiency of pairwise judgments verses ratings. Since the user study has only a limited number of subjects, pairwise judgments are also evaluated in a fully-automated fashion using a larger user sample size on television and movie datasets and their corresponding factor models.

First, though, the data is explained. Pairwise adaptive sequential feedback was used on two real datasets; namely the Movie dataset, and the TV dataset. The Movie dataset is the NETFLIX® prize training+probe data. This dataset consists of approximately 100 million "STAR" ratings (e.g., 1-5 stars) on about half a million users, on around 18,000 movies. A k=30 dimensional factor model (similar to the one in Equation #1) is fit to this data using stochastic gradient descent. The model parameters $$b^g, b_i^I, b^u, U, V,$$

and model fit are comparable to those of high performing models in the NETFLIX® Prize competition. For experiments with this dataset, the following parameter settings were used: $d_{svd}$=17, $n_{svd}$=500, $pop_{th}$=15000, $pop_{dec}$=1000, and $top_k$=2000. The user prior ($\mu_0$ and $\Sigma_0$) was set to the sample mean and covariance matrix from the learned user factors, U. These parameters (and those for the TV dataset next described) were chosen by a mixture of cross validation and experience with an eye towards the user study (again, the user study is described in later paragraphs).

The TV dataset is a proprietary digital television viewership dataset. The TV dataset consists of two weeks of anonymized Fall, 2009 programming data for approximately 72,000 viewers. As a privacy protection, the TV dataset was fully anonymized; all personal identifying characteristics of the data were removed prior to analysis. Additionally, the results are presented as aggregates and no individual anonymous record was singled out for study. In the data there were 8,687. TV programs after filtering for movies, paid programming, etc.

Because the TV dataset involves implicit feedback based on viewership as opposed to explicit ratings (as is the case for the movie data), the modeling is slightly more involved. However, after a model is fit and the parameters $$b^g, b_i^I, b^u, U, V,$$

are obtained, the predictions still follow those in Equation #1, and thus everything discussed so far applies to this factor model as well. For experiments with this dataset a k=10 dimensional factor model was used and the following parameter settings: $d_{svd}$=8, $n_{svd}$=400, $pop_{th}$=500, $pop_{dec}$=50, and $top_k$=1000. The user prior ($\mu_0$ and $\Sigma_0$) was set to the sample mean and covariance matrix from the learned user factors, U.

Now the Movie dataset user study is explained. Thirty one (31) volunteers participated in the user study. The user study consisted of two phases of acquiring user feedback. In Phase 1, users were asked to provide numeric ratings on the scale of 1 to 5 for forty (40) movies. All the users rated the same forty (40) movies, which were obtained by running k-means (40 means) on the learned movie factors, and subsequently picking the most popular movie from each of the forty (40) clusters. Clustering for ratings candidates reasonably represents all parts of the user factor space and thus efficiently provides user parameter information.

In Phase 2, users answered twenty five (25) pairwise preference questions sequentially generated in real time using Algorithm 1 (see FIG. 3). Incorporating the sequential pairwise responses 40 to these questions results in a final set of estimated user parameters, $u^p$. Finally, at the end of this Phase 2, the set of updated user parameters $u^p$ were used to generated a ranked list of twenty (20) movies. This ranked list was presented to the users and they were asked whether they liked the list or not. Recall that from Equation #3, the predicted ratings are Gaussian-distributed. Using $u^p$, a "top 20" list was generated by picking the twenty (20) movies whose signed difference in scores (post-feedback—pre-feedback) had changed the most. Taking into account predicted uncertainty, a movie's score was defined as its mean over its standard deviation ($\rho/\sigma$, in terms of Equation #3). By focusing attention on the movies whose signed differences changed the most, the inventors directly evaluate how well pairwise feedback information may be incorporated.

Lastly, at the end of both the phases, the users were asked to compare the enjoyability of the ratings task, verses the pairwise feedback task, namely a response to the question "Did you enjoy the task in Phase 2 more than the task in Phase 1?"

The results are quite encouraging. A large fraction of the users liked the recommended list generated via the adaptive pairwise feedback (23 out of 31 users, or about 74%). Thus in an absolute sense, the parameters learned by adaptive pairwise feedback are useful predictively. The users' feedback on the enjoyability of providing pairwise feedback was not as clear-cut, however. Only 14 out of 31 (or around 45%) enjoyed answering the pairwise questions 38 more than providing explicit star ratings. This is to be expected in some sense, for a few reasons. First, providing ratings is a much more familiar task to most users. Second, the sequential pairwise questions 38 are chosen by the IG criterion to be difficult to answer. Some users did express discomfort at being asked to choose between two objects they liked, or two objects they found difficult to compare.

Predictiveness and efficiency were also evaluated. Comparisons were made to determine how the user parameters 30 obtained using the explicit ratings feedback and using the proposed pairwise feedback performed predictively, and in terms of efficiency. Denote by $u^r$, the user vector obtained using the explicit ratings feedback, and by $u^p$, the user vector obtained using the proposed pairwise feedback scheme. For every user, a test set was created by reserving fifteen (15) random ratings out of the forty (40) total she provided in Phase I. Ratings were computed based on user parameters, $u_z^r$, using a random set of z=5, 10, 15, and 25 ratings. The pairwise feedback-based user parameters, $u_z^p$, were rated based on responses to 5, 10, 15, and 25 questions. Note that in the pairwise feedback scheme an estimate of the user bias ($b^u$ in Equation #1) is not computed. However, even without this term, a ranked list of movies may be generated using learned user parameters by computing a score (which is equivalent to a rating up to an additive constant, $b^u$) by performing the calculation in Equation #1 and dropping the $b^u$ value. Thus, the evaluation metrics all focus on comparing ranked lists from various procedures. For the predictive performance $u_z^r$ verses $u_z^p$ a "Ranked" Root Mean Squared Error (RRMSE) criterion is used. RRMSE uses a ground truth/test set of ratings, and a candidate ranked list of the same movies. The intuition behind RRMSE is to use only the rank ordering of the candidate list, with the corresponding values set in place to their true test values.

In particular, RRMSE was computed as follows. For some user u, both of her learned user parameters $u_z^p$ and $u_z^r$ were used to compute the ranked order of each of the fifteen (15) movies in her test set ($u_z^r$ and $u_z^p$ are obtained from z explicit ratings feedback, and pairwise feedback responses respectively). Call these ranked lists of movies $L(u_z^p)$ and $L(u_z^r)$. The objective is to compare how consistent these ranked lists are with the test ratings for the user. To do this, first compute a ranked list by sorting the fifteen (15) test ratings (with ties broken arbitrarily). Let this list be denoted by $L^{561}(u)$, and the corresponding list of sorted ratings by $S_{L^\star(u)}$. Now, in each of the candidate lists $L(u_z^p)$ and $L(u_z^r)$, replace the score of each movie with its user-provided test rating. Denote the resulting vectors by $$S_{L(u_z^p)}, \text{ and } S_{L(u_z^r)},$$

respectively. Then the RRMSE is evaluated as the root mean squared error of each of the vectors $$S_{L(u_z^p)}, \text{ and } S_{L(u_z^r)},$$

with respect to the vector $S_{L^\star(u)}$. Similar to RMSE, a lower RRMSE is better. Note that this score is agnostic to ties in the rankings. Table I below shows the mean RRMSE results.

TABLE I

MEAN TEST RRMSE ON THE USER STUDY.

| Method | z = 5 | 10 | 15 | 20 | 25 |
|---|---|---|---|---|---|
| Pair | 1.068 | 1.014 | 1.009 | 1.019 | 1.018 |
| Rate | 1.032 | 1.015 | 1.015 | 0.974 | 1.024 |

Pair=pairwise and Rate=Ratings based parameter performance. Each column header displays the number of ratings/number of pairwise responses used to obtain the user parameters. Roughly, RRMSE reduces with increasing z. Unfortunately, there is high uncertainty in the results and hence for the user study, in terms of predictive error. A clear winner may not be statistically declared, because the standard error is around 0.055. This is mostly due to the small size of the test data (only 15 ratings from only 31 users).

Automated experiments were then used to tease apart the differences. The aim is to sharpen the results from the user study using a larger number of users. Unfortunately, the costs of running a larger trial were prohibitive, so automated experiments were used. Because the pairwise algorithm requires feedback, the algorithm was evaluated using calculated responses to the questions from a learned ratings based user parameter vector, $u^r$. In what follows, the learned user parameters 30 are referred to as an "oracle" for that user. The oracle can be viewed in some sense as replicating behavior of a perfectly modeled user—a user who makes the exact same decisions that his learned user parameters dictate he would. First it is shown that the oracle experiments are valid, using the user study. Using the complete ratings data, that is, all forty (40) ratings per user, an oracle O is computed for every user, so that, $O=u_{full}^r$. User parameters $u^{pO}$ are then trained using the pairwise algorithm with oracle responses (answering 25 questions). The ranked lists obtained using the user parameters obtained in the user study, $L(u^p)$ (when the user actually interacted with the algorithm directly) are compared to those obtained from the oracle $L(u^{pO})$.

The comparisons use normalized discounted cumulative gain (nDCG) between two ranked lists as evaluation metric. (Note that using a factor model for the ground truth in the automated experiments provides a total ordering over the items. This enables use of nDCG as an evaluation criterion. In the user study, though, nDCG was not used due to the presence of ties on ratings of items in the test set.) The first ranked list was used as the gold standard and evaluated the nDCG of the second list compared to it.[1] The inventors find that nDCG $(L(u^{pO}), L(u^p))=0.73$ (with standard error 0.04). This shows much stronger correlation than by chance, where nDCG(L $(u^{pO}), L(u^{rand}))\approx 0.49$ (using 500 random user vectors, $u^{rand}$, from the fit U). Thus, to a reasonable degree, an oracle based on ratings data, provides a good approximation to a user's actions.

[6]nDCG is defined in our case as $nDCG(L_1, L_2)=DCG_p^1/DCG_p^2$, with $$DCG_P^k = \sum_{q=1}^{p} \frac{rel_q(k)}{\log_2(l+q)}.$$

We define relevance in terms of ranks of the items with respect to the list $L_1$. $rel_q(k)=1/rank$ (the $q^{th}$ item from $L_k$ in $L_1$). As defined $nDCG(L_1,L_1)=1$. In all our experiments we set p=500.

Having established correlation between actual user feedback and their oracles, the question of efficiency is re-examined; namely, for a fixed amount of feedback, do static ratings or adaptive pairwise comparisons provide more efficiency in estimating user parameters? In particular, efficiency is investigated with respect to recovering the oracle's ranking of the items.

This question of efficiency was evaluated on the Movie dataset by randomly selecting five hundred (500) users. As in the user study, ratings were computed based user parameters, $u_z^r$, using a random z=5, 10, 15, 20 and 25 of the users ratings. The user oracle, $O=u_{all}^r$ was also computed, which is based on all the users ratings. Next, the user parameters, $u_z^{pO}$ were computed, based on responses to z=5, 10, 15, 20 and 25 sequential and adaptive pairwise questions, using the oracle O. This evaluation focuses on how close to the oracle's ranking of items each scheme gets after seeing some number of responses. This is done by comparing $nDCG(L(u_{full}^r), L(u_z^r))$ to $nDCG(L(u_{full}^r), L(u_z^{pO}))$. Note that although $u_z^{pO}$ appears to be more powerful than $u_z^r$ (because, in some sense, the oracle O "sees" all the ratings), the inventors conclude it is still a reasonable comparison, because $u_z^{pO}$ is computed only using some small number of responses z using O (and the user study demonstrated that even after z=25 responses there still are appreciable differences between the oracle and pairwise vectors). The inventors also investigate the benefits of adaptively and sequentially choosing pairwise preference questions by evaluating a pairwise feedback scheme that does not use the criterion, but rather just asks preference questions from among random pairs of items (Random-Pairwise). Note that the update and modeling procedure remains the same as before; the only change is that pairs of items are picked at random. Finally, to complete the evaluation, comparisons were also made to greedy "optimally" ordered ratings. These results are obtained by ordering the users' ratings greedily in a forward stage-wise manner. More precisely, at any stage in the procedure, for each user, the user's rating of one item is added to the set. In particular, the item added is the item rating that results in parameter estimates that are closest to $u_{full}^r$ (the inventors initialize with an empty set of ratings and set the user vector to zero). This process continues, adding ratings in a sequential manner and remembering the order. Parameter estimates (Opt-Ratings) are then computed using z=5, 10, 15, 20 and 25 of these "optimally" ordered ratings. These ratings are sequentially ordered greedily to result in parameter estimates closest to $u_{full}^r$. The aim of exploring this strong baseline is to analyze the performance of a scheme analogous to active learning strategies that adaptively and sequentially solicit ratings. Note that though this greedy forward stage-wise scheme is not strictly comparable to true active learning schemes, the inventors believe that it is a strong baseline for any ratings based approach as it uses information about all the ratings (via the oracle, $u_{full}^r$), in order to retrospectively order the ratings. For both of these schemes, Random-Pairwise and Opt-Ratings, an evaluation is made of nDCG (compared to $L(u_{full}^r)$). Thus the final evaluation is for the following four distinct schemes: the adaptive sequential pairwise feedback scheme of this disclosure, a random pairwise scheme, a random ratings scheme, and an "optimal" ratings scheme.

Figure 4:
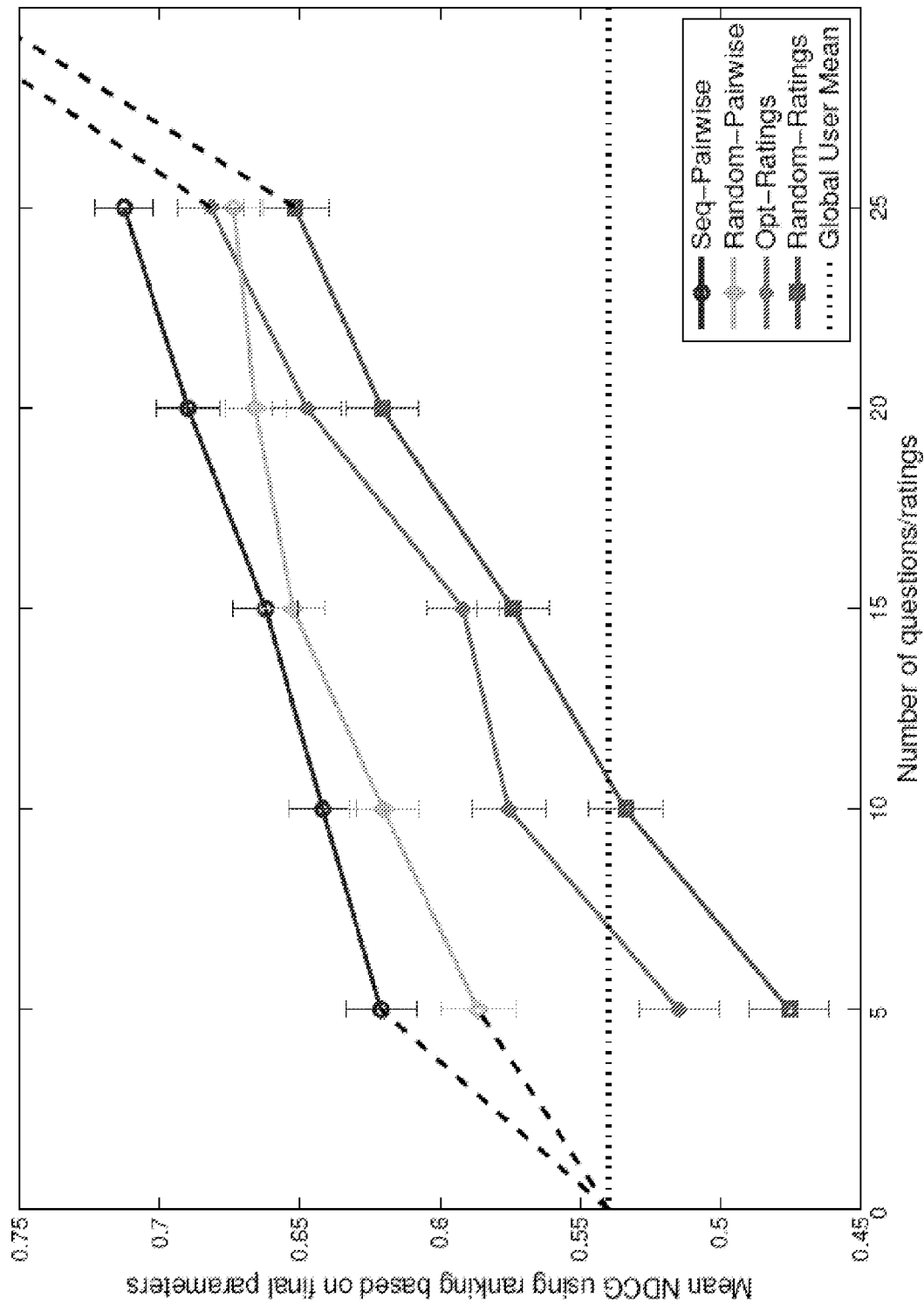
FIG. 4 is a graph illustrating the results of the automated experiment, according to exemplary embodiments.

FIG. 4 is a graph illustrating the results of the automated experiment, according to exemplary embodiments. FIG. 4 illustrates the mean nDCG values (along the y-axis) compared to $L(u_{full}^r)$ for the 500 randomly selected users. These are plotted as a function of the number of (oracle) feedback questions/ratings (the x-axis) used to compute the parameters. The different lines are for the four different schemes. Interpolation lines are also shown.

As FIG. 4 illustrates, a dramatic improvement in efficiency is seen using pairwise feedback, even for a small number of questions/ratings. Illustrated in FIG. 4 is the nDCG compared to the oracle—note that the ratings based estimates will approach an nDCG value of 1 as all the user ratings are incorporated. This is indicated by the dashed (extrapolation) lines at the right ends of the computed data. Similarly, the pairwise prior parameters ($\mu_0$=global user mean=$1/n\Sigma_j u_j$) has nDCG=0.539 (as shown by the dotted line). Because this is the prior for the pairwise parameters, the left edges of the data may be connected with interpolation lines. Also shown is a ±1 standard error (all around 0.01).

The results show that for equal, but small, numbers of questions/ratings, pairwise feedback is more efficient than ratings information for recovering ranking information. In particular, after twenty five (25) adaptive pairwise responses, the nDGC becomes approximately 0.713. With only twenty five (25) ratings, nDGC reaches around 0.652 (random ratings). Even in the best case, twenty five (25) optimally chosen ratings only seems to give as efficient performance as using feedback from twenty five (25) random pairs, with nDGC around 0.65 for both. Also, the results verify that using adaptively selected pairwise feedback is significantly better than random pairwise feedback.

The TV dataset yielded similar results. The TV dataset, however, results in higher nDCG values, mainly due to the binary nature of the ratings in this setting. After twenty (20) feedback questions, a significant improvement in the mean nDCG of 0.884 was obtained, compared to the oracle versus the global mean comparison of 0.758.

Exemplary embodiments thus describe a novel sequential adaptive Bayesian scheme for incorporating pairwise preference feedback in latent factor models. Exemplary embodiments were evaluated on two real datasets. The results show that most users like providing feedback. The results also show that adaptive pairwise preference feedback is more efficient versus static ratings information when evaluated on learning the ranking preferences of a user.

Figure 5:
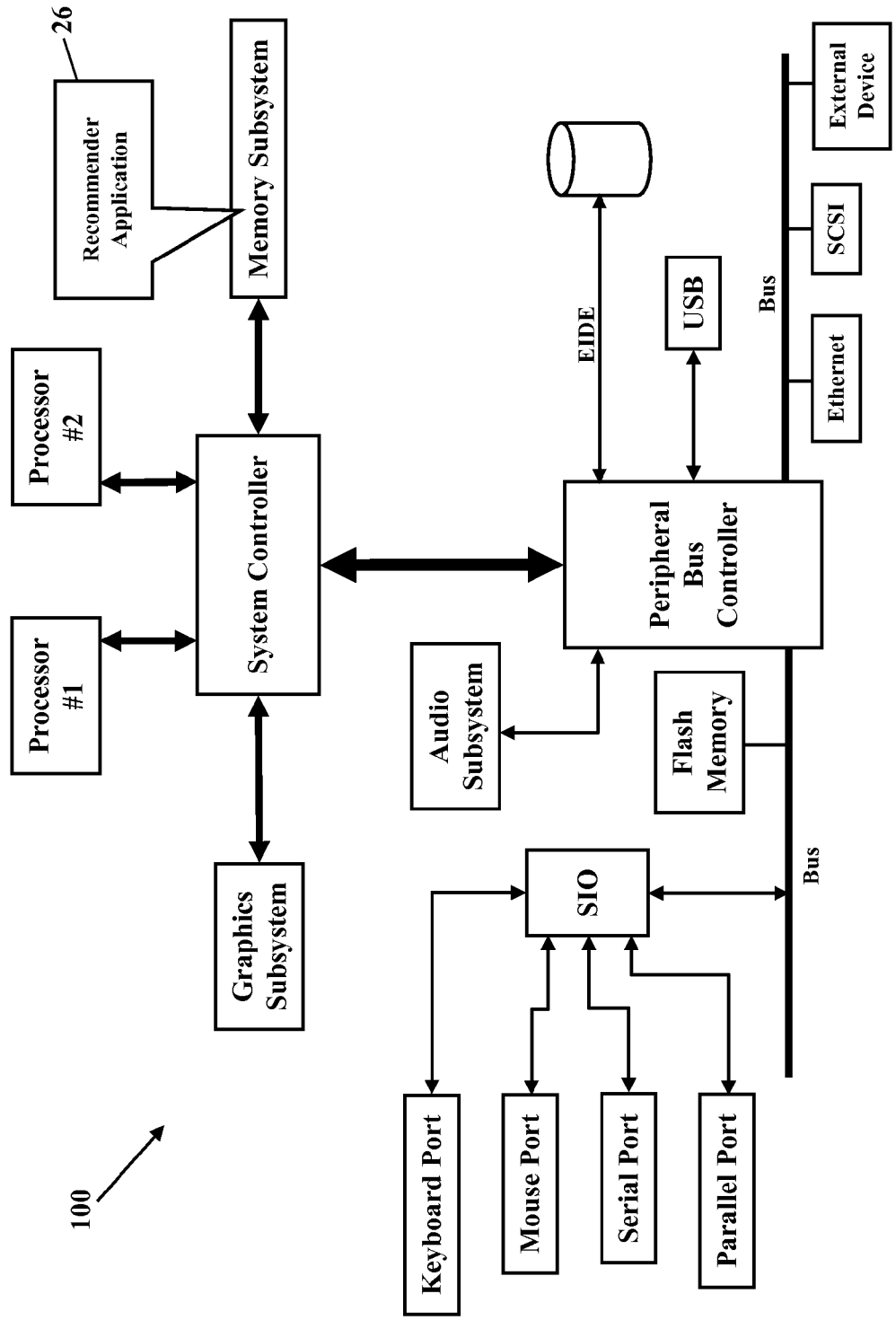
FIG. 5 is a generic block diagram of a processor-controlled device, according to exemplary embodiments.

FIG. 5 is a schematic illustrating still more exemplary embodiments. FIG. 5 is a generic block diagram illustrating the recommender application 26 operating within a processor-controlled device 100. As the paragraphs explained, the recommender application 26 may operate in any processor-controlled device 100. FIG. 5, then, illustrates the recommender application 26 stored in a memory subsystem of the processor-controlled device 100. One or more processors communicate with the memory subsystem and execute the recommender application 26. Because the processor-controlled device 100 illustrated in FIG. 5 is well-known to those of ordinary skill in the art, no detailed explanation is needed.

Figure 6:
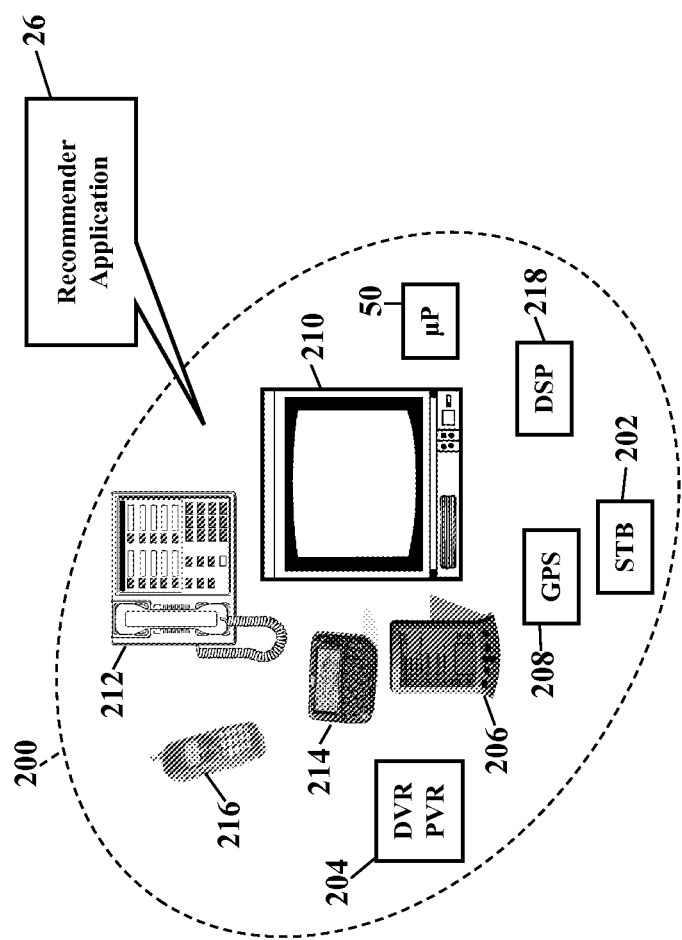
FIG. 6 depicts other possible operating environments for additional aspects of the exemplary embodiments.

FIG. 6 depicts other possible operating environments for additional aspects of the exemplary embodiments. FIG. 6 illustrates the recommender application 26 operating within various other devices 200. FIG. 6, for example, illustrates that the recommender application 26 may entirely or partially operate within a set-top box ("STB") (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system, communications device, or processor-controlled device utilizing the processor 50 and/or a digital signal processor (DP/DSP) 218. The device 200 may also include watches, radios, vehicle electronics, clocks, printers, gateways, mobile/implantable medical devices, and other apparatuses and systems. Because the architecture and operating principles of the various devices 200 are well known, the hardware and software componentry of the various devices 200 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for recommending items using responses to adaptive pairwise questions, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
posing a sequence of pairwise questions to a user asking the user to select one content item from a pair of different content items;
receiving successive responses from the user to each pairwise question, each response selecting a preference for the one content item in the pair of different content items in each pairwise question;
incorporating each successive response as feedback into an adaptive latent factor model for recommending content to the user; and
recursively determining after each successive response a probability that the user will have the preference for another content item in another pair of different content items.

2. The method according to claim 1, further comprising determining the probability that the user prefers the one content item in the pair of different content items.

3. A system, comprising:
a processor; and
memory storing code that when executed causes the processor to perform operations, the operations comprising:
posing a sequence of pairwise questions to a user, each pairwise question asking the user to select from a pair of different movies;
receiving successive responses from the user, each response selecting a preference for one movie in the pair of different movies in the pairwise question;
incorporating each successive response as feedback into an adaptive latent factor model for recommending movies to the user; and
recursively determining after each successive response a probability that the user will have the preference for another movie in another pair of different movies.

4. The system according to claim 3, wherein the operations further comprise estimating a user parameter.

5. The system according to claim 4, wherein the operations further comprise updating the user parameter with each response to each pairwise question in the sequence of pairwise questions.

6. The system according to claim 4, wherein the operations further comprise assuming a multivariate normal form for the user parameter.

7. The system according to claim 3, wherein the operations further comprise selecting the pairwise question based on the feedback.

8. The system according to claim 3, wherein the operations further comprise updating the adaptive latent factor model with each successive response to the sequence of pairwise questions.

9. The system according to claim 3, wherein the operations further comprise deriving an information gain criterion.

10. A memory storing instructions that when executed cause a processor to perform operations, the operations comprising:
posing a sequence of pairwise questions to a user, each pairwise question asking the user to select from a pair of different movies;
receiving successive responses to the sequence of pairwise questions, each response selecting a preference for one movie in the pair of different movies in the pairwise question;
incorporating each successive response as feedback into an adaptive latent factor model for recommending content to the user;
selecting a next pairwise question in the sequence of pairwise questions based on a current response to a current pairwise question in the sequence of pairwise questions; and
recommending a movie to the user based on the adaptive latent factor model.

11. The memory according to claim 10, wherein the operations further comprise determining a probability that the user prefers the movie over another movie.

12. The memory according to claim 10, wherein the operations further comprise estimating a user parameter.

13. The memory according to claim 12, wherein the operations further comprise updating the user parameter with the current response to the current pairwise question.

* * * * *